June 16, 1942.  F. W. BROOKE  2,286,668
MANUFACTURE OF HOLDING CAPS FOR SELF-LOCKING NUTS
Original Filed June 4, 1941

INVENTOR
Frank W. Brooke
BY
C. M. Clarke
Attorney

Patented June 16, 1942

2,286,668

UNITED STATES PATENT OFFICE 2,286,668

MANUFACTURE OF HOLDING CAPS FOR SELF-LOCKING NUTS

Frank W. Brooke, Pittsburgh, Pa.

Original application June 4, 1941, Serial No. 396,547. Divided and this application August 14, 1941, Serial No. 406,744

6 Claims. (Cl. 10—86)

This invention is an improvement in self locking nuts utilizing a holding unit of suitable material, engageable with the threads of a co-acting bolt, confined within a holding cap secured upon the outer face of the nut. It refers particularly to the method of making the cap and to the cap itself.

The self locking nut in its entirety comprises, with the nut itself of any standard form, as square, hexagonal, or other suitable shape, a separately applied and attached holding cap, of sheet metal, and a thread engaging unit of suitable material, immovably confined within the cap. This application is a division of my application Ser. No. 396,547 filed June 4, 1941.

In the drawing, showing one preferred form of the invention:

Figure 1:
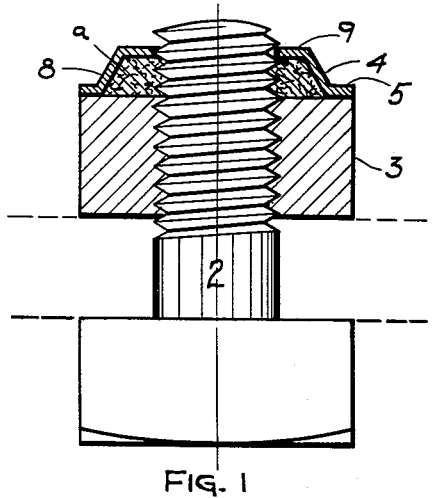
Fig. 1 is a view of a bolt with the improved attachment and nut, in section.

Referring to the drawing, the bolt 2 and nut 3 are of usual standard construction and of any dimensions as to length, diameter, gauge of threads, or shape of nut.

Secured upon the outer face of nut 2 is a coniform cap 4 by its flanges 5, made as hereinafter described, and enclosing the thread engaging unit a. Such unit is of a composition sufficiently plastic for sufficient deformation to be acted upon by the entering terminal threads of the bolt as the nut is applied, and by compression and compensating movement, to become closely engaged with the threads throughout the depth of the unit.

While any suitable substance or material may be utilized for such preformed unit, such as rubber, fibre, fibrous composition, comminuted cork, etc., I prefer to use a composition including asbestos fibre or other heat resisting material, and a binder, as more fully disclosed in my companion application noted.

Figure 3:
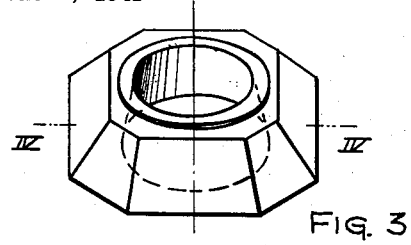
Fig. 3 is a perspective view of the thread engaging unit.
Figure 4:
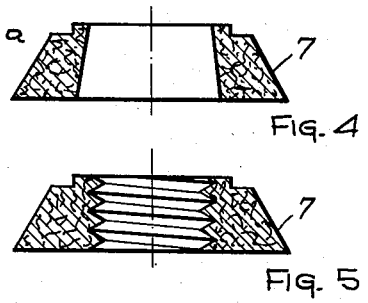
Fig. 4 is a vertical section of the unit on the line IV—IV of Fig. 3.
Figure 5:
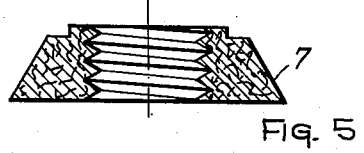
Fig. 5 is a similar view of the unit after being engaged by the threaded bolt.
Figure 2:
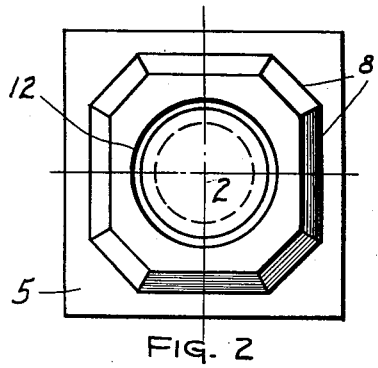
Fig. 2 is a plan view thereof.

The preformed unit a is shown in Figs. 3 and 4, while Fig. 5 shows it as deformed by the threads of the entering bolt when the nut is applied, Figs. 4 and 5 being slightly enlarged.

The cap 4 is made of relatively thin sheet metal stamped from a continuous uniform width strip blank preferably having transverse slits 6 for easy and accurate shearing by a shear blade of the width of the slits, to provide the rectangular base within the edges of flanges 5 conforming to the outer face of nut 3.

In the case of a hexagon or other form of nut, the outline of the base would be made conformably with the outer edges matching those of such nut. As shown the middle cap portion 4 is of a form to receive the sloping faces 7 of unit a when the unit is inserted in the cap, as in Fig. 1.

Both are of generally irreguular octagonal form, the cap having sloping walls 8, the inner faces of which engage corresponding sloping faces 7 of the unit as also the corner portions thereof. By such construction, when the cap is secured to the nut by its flanges, rotation of the unit by the bolt in entering, is prevented.

The cap may be secured to the nut in any convenient manner, preferably by spot welding, under pressure.

Figure 6:
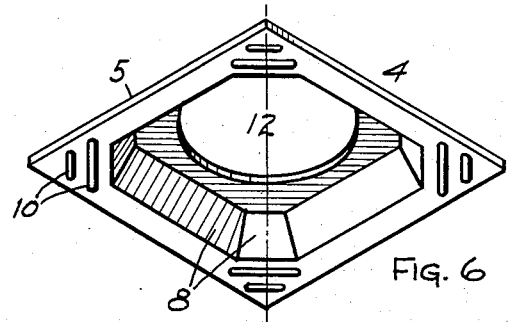
Fig. 6 is a perspective view of the under side of the unit retaining cap or housing.
Figure 7:
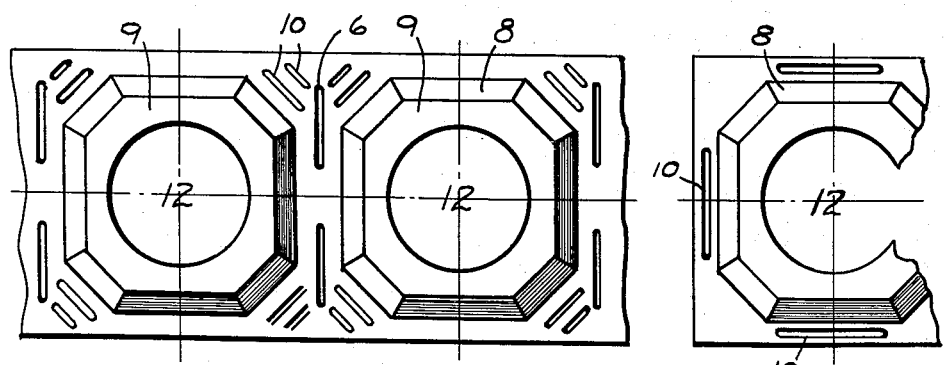
Fig. 7 is a plan view of a portion of the continuous sheet metal strip from which the caps are made.
Figure 8:
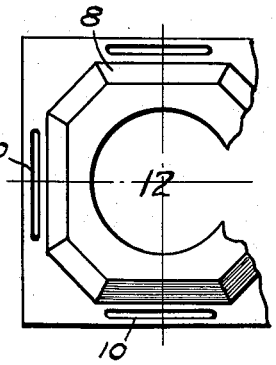
Fig. 8 is a partial plan view of one of the caps, showing a modification.

Spot welding is facilitated by providing depression areas at suitable locations, as by grooves and opposite ribs or other pressed out sections 10 of the metal flanges at the corners, as in Fig. 6, or at the sides as in Fig. 8.

By making the blank in continuous strip form and subjecting it to successively spaced deformation treatments, the units may then be inserted, followed by severance and removal for application to appropriate conforming nuts, as described in my said companion application.

In the case of providing for other shapes of nuts, as hexagonal, octagonal, etc., the same operations are followed with but slight waste of the used blanks.

The construction and method of making the caps of my improved self-locking nut will be clearly understood and appreciated by all those skilled in the art. It is extremely simple and economical to make and use, very efficient in operation, and with the contained unit, positively overcomes and compensates for vibration loosening.

The length of any commercial size of nut from the largest to the smallest is but slightly increased, and the nut and its thread-engaging unit may be handled commercially as a standard article.

While the cap may also be made from individual square or other shaped blanks, the pressing and final severance as in the strip construction described, contributes to speed and economy in manufacture.

What I claim is:

1. In the manufacture of holding caps for self locking nuts, the method consisting in deforming a uniform width sheet metal strip to provide a series of sections partly separated by intervening transverse narrow slits facilitating straight shearing to provide uniform edge flanges, polygonal outwardly disposed inwardly inclined portions having inner wall faces, and an outer retaining wall with a clearance opening therein extending beyond the plane of the strip whereby to receive and hold a bolt engaging unit, and then shearing connecting portions of the strip transversely between each of said sections in alinement with the slits.

2. In the manufacture of holding caps for self locking nuts, the method consisting in deforming a uniform width sheet metal strip to provide a series of sections each having a flange, polygonal outwardly disposed inwardly inclined portions having inner wall faces and an outer retaining wall with a clearance opening therein extending beyond the plane of the strip whereby to receive and hold a bolt engaging unit, forming pressed out welding extensions through the flange, and then shearing the strip transversely between each of said sections in preparation for then welding one of said sections to the outer face of a nut.

3. In the manufacture of holding caps for self locking nuts, the method consisting in deforming a uniform width sheet metal strip blank to form an inwardly inclined unit holding portion extending beyond a surrounding flange having outer edges conforming to the shape of a utilizing nut and an outer apertured unit retaining wall, forming pressed out welding extensions on the flanges, and severing individual flanged holding caps and their flanges transversely of the blank to form with its side edges a uniform plurality of flange edge portions.

4. In the manufacture of holding caps for self locking nuts, the method consisting in progressively and sectionally deforming a continuous sheet metal parallel edge blank by partially slitting transversely between defined sections thereof whereby to effect continuous straight flange-defining edges when the sections are finally severed, pressing the middle portion of each section outwardly to form a surrounding inwardly inclined unit-retaining wall terminating in a centrally apertured flat closing wall, and then separating the sections by shearing through integral connecting portions in alinement with intervening slits.

5. In the manufacture of holding caps for self locking nuts, the method consisting in progressively and sectionally deforming a continuous sheet metal parallel edge blank by partially slitting transversely between defined sections thereof whereby to effect continuous straight flange-defining edges when the sections are finally severed, pressing the middle portion of each section outwardly to form a surrounding inwardly inclined unit-retaining wall terminating in a centrally apertured flat closing wall, placing a thread engaging unit within the retaining side and closing wall portions, and then separating the sections by shearing through integral connecting portions in alinement with intervening slits.

6. In the manufacture of holding caps for self locking nuts, the method consisting in progressively and sectionally deforming a continuous sheet metal parallel edge blank by partially slitting transversely between defined sections thereof whereby to effect continuous straight flange-defining edges when the sections are finally severed, pressing the middle portion of each section outwardly to form a surrounding inwardly inclined unit-retaining wall terminating in a centrally apertured flat closing wall, forming pressed out welding extensions through flange portions of the blank, and then separating the sections by shearing through integral connecting portions in alinement with intervening slits.

FRANK W. BROOKE.